April 28, 1959 C. W. CHILLSON 2,883,883
VARIABLE SPEED TRANSMISSION
Filed Nov. 13, 1957 2 Sheets-Sheet 1
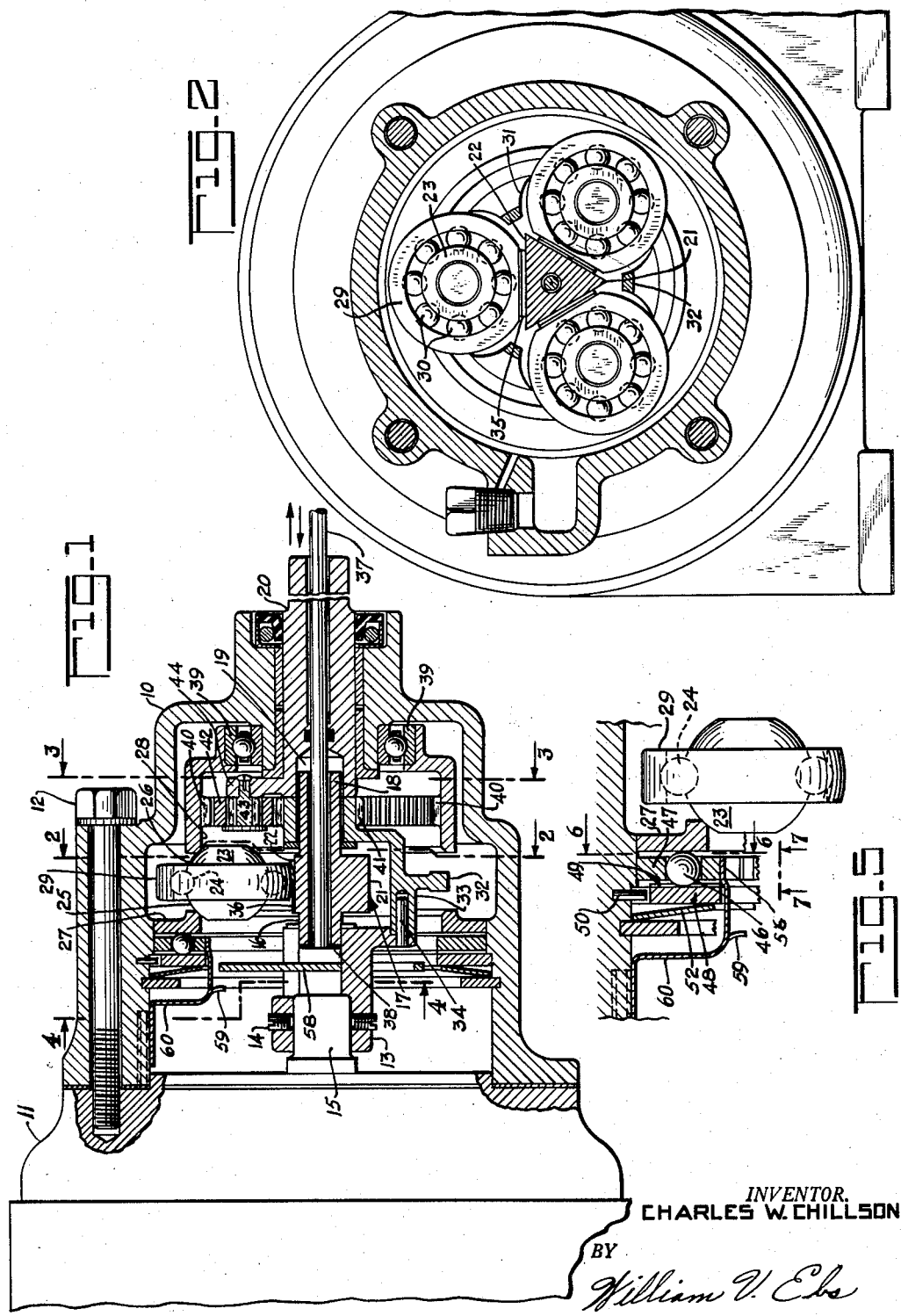
INVENTOR.
CHARLES W. CHILLSON
BY
*William V. Ebs*
ATTORNEY April 28, 1959 C. W. CHILLSON 2,883,883
VARIABLE SPEED TRANSMISSION
Filed Nov. 13, 1957 2 Sheets-Sheet 2
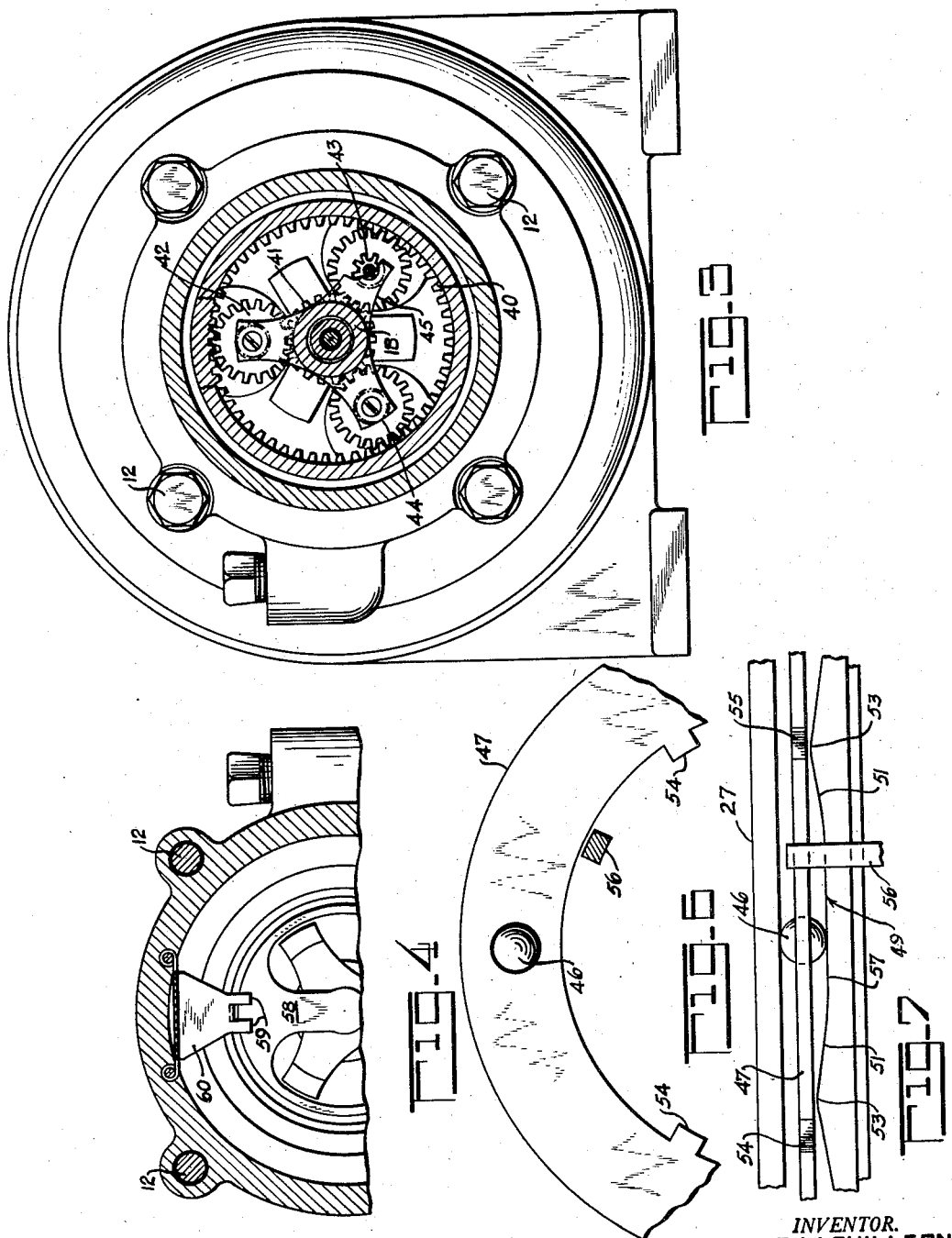
INVENTOR.
CHARLES W. CHILLSON
BY
*William V. Ebs*
ATTORNEY

United States Patent Office 2,883,883
Patented Apr. 28, 1959

2,883,883

VARIABLE SPEED TRANSMISSION

Charles W. Chillson, Packanack Lake, N.J., assignor to Curtiss-Wright Corporation, a corporation of Delaware Application November 13, 1957, Serial No. 696,266

7 Claims. (Cl. 74—690)

My invention relates to speed changers of the infinitely variable ratio type wherein the speed of a driven member may be varied with respect to the speed of a driving member in infinitely small steps. In particular the invention is directed to an improved speed changer of the type disclosed in the copending application of Edward K. Hine et al., for "Ball Speed Changers," Serial Number 465,500 filed October 29, 1954 and assigned to the same assignee as the present invention.

The speed changer in the invention includes a plurality of tiltable rotatable elements such as shown in the aforesaid application which rotating elements are engaged in races driven by an input shaft. These rotatable elements have spherical surface portions which during normal operation of the device engage angular race members comprising a reaction member and an output member to cause rotation of the output member at a speed and in a direction determined by the angle and direction of tilt respectively of the rotational elements.

It is a feature of the present invention that the rotational elements and reaction member serve as clutch elements and the reaction member is an actuating member for an overload mechanism which functions to reduce bearing pressure between the clutch elements to bring about a suspension in the transmission of power from the input to an output shaft in the event an excessive load is imposed upon the output shaft. A further feature of the invention is the provision of differential gearing between the output member and output shaft which gearing makes possible the desired output speed range for the device. By reason of the differential gearing the speed range may, for example, be rendered variable between zero and some predetermined value as in the form of the invention described herein and shown in the accompanying drawings.

Accordingly, one object of the invention is to provide a speed changer of the type having an output speed which is rendered infinitely variable over a particular range in the described manner wherein the transmission of power from input to output shafts is suspended in the event the output shaft is loaded excessively.

Another object of the invention is to provide such a speed changing device with differential gearing connected to the input shaft and an output member which is subject to rotation in opposite directions whereby a desired speed range for the output shaft is obtained.

Further objects of the invention will become apparent in following the ensuing detailed description in connection with the drawings, wherein similar reference characters designate similar parts and wherein;

Fig. 1 is a longitudinal sectional view through the speed changer of the invention, Fig. 2 is a cross sectional view taken on plane of the line 2—2 of Fig. 1, Fig. 3 is a cross sectional view taken on the plane of the line 3—3 of Fig. 1, Fig. 4 is a fragmentary sectional view taken on the planes of the line 4—4 of Fig. 1, Fig. 5 is an enlarged fragmentary view of the overload mechanism for the speed changer, Fig. 6 is a fragmentary sectional view taken on the plane of the line 6—6 of Fig. 5, Fig. 7 is a view taken on the plane of the line 7—7 of Fig. 5.

Referring to drawings, reference character 10 designates the speed changer housing which as shown is fixed to motor 11 by bolts 12. The speed changer includes an input shaft 13 which is shown attached by set screws 14 to the output shaft 15 of motor 11. As shown, the input shaft 13 is hollow and a cylindrical end portion 16 of a member 17 is slidable therein. An opposite cylindrical end portion 18 of the member 17 is slidable within a hollow end portion 19 of the output shaft 20 of the speed changer.

The member 17 has an intermediate portion 21 which is triangular in cross section and defines the flat surfaces 22. Disposed about this intermediate portion 21 of the member 17 are three transmission elements 23 each having a peripheral groove 24 therearound which defines an axis of rotation for the element normal to the plane of the groove. As shown, the elements 23 include spherical surface portions 25 and 26 disposed on opposite sides of the peripheral groove and having a common center at the center of the element. Such spherical surface portions 25 and 26 are engaged by the members 27 and 28 respectively. Each element is embraced by a shroud race 29 which is internally grooved to accommodate small bearing balls 30, these balls also engaging the race groove 24. A spacer element 31 extends between the shroud races where it is engaged by the elements 32 of a spider 33, such spider being secured as at 34 to the input shaft 13 so that rotational movement of the input shaft is imparted to the races. The shroud races 29 are each furnished at their inner portions adjacent the flat surfaces 22 with a shoe 35 which attaches to the flat surfaces by straps or ribbons including the strap 36, as disclosed in the aforementioned copending application such that the shoe will roll on the surfaces 22 upon longitudinal movement of member 17, and will be caused to rotate upon rotation of the races.

Longitudinal movement may be imparted to the member 17 by adjustment of plunger 37 which as shown extends through both the output shaft 20 and the member 17. Such plunger is slidable within the member 17 but has a stop plate 38 formed on its leftward end as viewed in Fig. 1 by means of which the member is moved to the right as the plunger moves to the right. The member 17 is biased toward an extreme leftward position defined by the engagement of the portion 21 of the member with the input shaft, and the member 17 will move toward such position carrying the plunger with it provided movement of the plunger is not prevented.

The member 17 is biased toward the extreme leftward position by the straps or ribbons between the member and races 29 which are placed in stress as the member 17 is moved to the right and are stress relieved when the member is in its position to the left. In the extreme left position of the member 17, the rotational elements 23 are all tilted by reason of their connection with member 17. As member 17 is moved to the right the races 29 are moved toward vertical positions and finally beyond the vertical, tilting the rotational elements in a direction opposite to that in which they are tilted when member 17 is in the extreme leftward position. By tilting the elements 22 in this manner the output r.p.m. of the speed changer may be varied over a desired range for any constant input r.p.m.

Assuming some constant input r.p.m. is imparted to input shaft 13 by rotation of the motor shaft 15, spider 33 is caused to rotate whereupon the shroud races 29 of the elements 23 are also caused to rotate. As previously indicated the members 27 and 28 engage spherical portions of the elements 23. The member 28 is a rotatable member being mounted on the bearing 39 but member 27 is relatively stationary. Accordingly, as the races 29 rotate, elements 23 also rotate in the races on their own axes as a result of their engagement with member 27 which because of its function in this respect may be termed a reaction member. The member 28 is driven by rotation of the elements 23 in a direction and at a speed according to their direction and angle of tilt as determined by the position of plunger. As described in the copending application changes in speed and direction of rotation of member 28 due to tilting result from changes in the ratio of respective radii extending between the axes of the elements 23 and points of contact of the elements with members 27 and 28.

As shown the member 28 includes an internal gear 40 which is one of two driving gears of a planetary gear system. The other driving gear 41 is formed on the spider 33 for rotation by input shaft 13. The driving gears 40 and 41 mesh with the planetary gears 42, 43 and 44 which drive the output shaft 20 through spider connection 45. The provision of differential gearing, such as the planetary gear system described, between the transmission elements 23 and output shaft 20 is an important feature of the speed changer of the invention. As will be apparent to persons skilled in the art, by reason of the differential gearing rotation of the output shaft may by appropriate design be made unidirectional or reversible. It is merely a matter of taking account of the speed and direction of rotation by the member 28 for a given input r.p.m. and proportioning the other parts of the planetary gear system to obtain the desired result. Preferably, and in the form of the invention herein described, the differential gearing is adapted to provide a speed range variable from zero to a predetermined value with the extreme leftward position of member 17 corresponding to zero output speed and increases in speed being obtained by moving the plunger 37 and member 17 to the right.

In accordance with the invention the speed changer functions to suspend the transmission of power between the input and output shaft in the event the output shaft is overloaded. Mechanism for accomplishing this includes the ball 46, the ball retaining member 47, and the cam disc 48 (see Figs. 5–7). The member 47 holds three such balls as the balls 46 spaced equal distances apart therearound. These balls are in contact both with the member 27 and with cam surfaces 49 on the disc 48. Cam disc 48 includes three such cammed surfaces 49 of equal extent which extend continuously one into the other, and the retaining member 47 is disposed with each of the balls 46 between one of the cammed surfaces and member 27. The disc 48 is axially movable, but is rotationally fixed by pin 50.

In normal operation of the speed changer, the balls 46 occupy positions on inclined surfaces 51 of the cams 44 according to the loading of the output shaft. It is the member 27 which causes the balls to assume such positions. The member 27 is capable of limited rotational and axial movement, and loading on the output shaft is transmitted to such member at its point of contact with rotational elements 23 causing the members to rotate and the balls 46 to roll some distance up the inclined surfaces 51 of the cams. This forces the member 27 firmly against rotational elements 23 and moves disc 48 axially against the force of a spring 52. Accordingly the balls assume positions on the inclined surfaces 51 dependent upon the loading force transmitted to member 27 as compared to the strength of the spring 52. Rotational movement of member 27 beyond that required for positioning the balls 46 is prevented by the frictional force developed between the balls and member.

In the event the output shaft is overloaded the balls are caused by reason of the high loading force transmitted to member 27 to override high points 53 of the respective cam surfaces on which they normally ride and to roll onto adjoining cam surfaces. Rolling of the balls 46 on the adjoining cams is limited by the engagement of a projection 54 on the ball retaining member 47 with latch 56. Three equally spaced projections 54 are provided on the member 47 such that the overload mechanism may function properly regardless of which of the particular cam surfaces and balls are engaged. When the said projection engages the latch the balls 46 are disposed in the low regions 57 of the cams. With the balls so disposed the bearing pressure of the balls on member 27 and of the member 27 on the rotational elements 23 is reduced as compared to these bearing pressures when the balls are on the inclined surfaces of the cams. As a result either member 27 slides over the balls 46, or the rotational elements slide on member 27 and no power is transmitted between input and output shafts of the speed changer.

The latch is easily reset to provide for the transmission of power once again by means of the plunger 37. As viewed in Fig. 1, if the plunger is moved to the left beyond a position of contact with member 17 in its extreme leftward position, the plate 58 which is fixed to the member is caused to strike tab 59 on spring member 60. Spring member 60 which is secured to the housing 10 at one end is caused to move so as to withdraw the latch 56 formed at its other end from its position of obstruction with the retaining member whereupon member 47 turns and the balls 46 roll into positions on the inclined surfaces of the cams. As a result the transmission of power is resumed.

The merit of the invention will now be readily appreciated in view of the foregoing description directed to its construction and operation. In particular the advantages of the differential gearing for providing a desired output speed range and direction of rotation, and advantages of the overload feature of the device whereby the transmission of power is suspended in the event the output shaft is overloaded will now be apparent.

It will of course be appreciated that while a preferred embodiment of the invention has been disclosed herein various changes may be made in the described device without departing from the spirit and scope of the invention. Reference should be made to the following claims for the limits of the invention.

I claim:

1. A speed changing device comprising an input shaft; an annular reaction member and annular output member which are coaxial; a rotational element which is eccentric to the axis of said members lying therebetween and in frictional engagement with the members; means for driving said rotational element in accordance with the speed of the input shaft whereby said output member is caused to rotate; means for tilting said rotational element for changing the speed of the output member; an output shaft; means operably connecting said output member with said output shaft; and means including said reaction member responsive to an overloading of the output shaft for suspending the transmission of power between input and output shafts.

2. A speed changing device comprising an input shaft; an annular reaction member and annular output member which are coaxial; a rotational element which is eccentric to the axis of said members lying therebetween and in frictional engagement with the members; means for driving said rotational element in accordance with the speed of the input shaft whereby said output member is caused to rotate; means for tilting said rotational element for changing the speed of the output member; an output shaft; differential gearing for driving said output shaft operated according to the speed of said input shaft and said output member; and means firmly pressing said member against the rotational element during normal operation of the device operative upon overloading of the output member to relieve such pressure and suspend the transmission of power between input and output shafts.

3. A speed changing device comprising an input shaft; an annular reaction member and annular output member which are coaxial; a rotational element which is eccentric to the axis of said member lying therebetween and in frictional engagement with the members; means for driving said rotational element in accordance with the speed of the input shaft whereby said output member is caused to rotate; an output shaft; means operably connecting the output member with said output shaft; a cam; an element on the cam exerting a force on the reaction member during normal operation of the device whereby the reaction member is pressed against the rotational element, said element being moved into a position on said cam upon overloading of the output shaft such that the pressure of said reaction member on the rotational element is reduced and the transmission of power between input and output shafts is suspended; and means for obstructing movement of said element beyond such position.

4. The combination as defined in claim 3 wherein the element on said cam is moved into a position on the cam by said reaction member upon overloading of said output shaft such that the pressure of the reaction member on the rotational element is reduced and the transmission of power suspended.

5. The combination as defined in claim 3 with the addition of means for moving said obstructing means so that the element on the cam may be moved from the said position in which the transmission of power is suspended such that the transmission of power between input and output shafts may be resumed.

6. The combination as defined in claim 3 with the addition of means for tilting the rotational element for altering the output speed of the device; actuating means for the tilting means; and means operable by such actuating means for moving said obstructing means so that the element on the cam may be moved from the said position in which the transmsision power is suspended such that the transmission of power between input and output shafts may be resumed.

7. A speed changing device comprising an input shaft; an annular reaction member having a fixed position for any particular loading of the speed changing device and movable therefrom upon a change in the loading of the device; an annular output member coaxial with the reaction member; a rotational element which is eccentric to the axis of said members lying therebetween and in frictional engagement with the members; means for driving said rotational element in accordance with the speed of the input shaft whereby said output member is caused to rotate; means for tilting said rotational element for changing the speed of the output member; an output shaft; means operably connecting said output member with said output shaft; and means responsive to movements of said reaction member for suspending the transmission of power between input and output shafts upon an overloading of the output shaft.

References Cited in the file of this patent

UNITED STATES PATENTS

| 1,762,199 | Standish | June 10, 1930 |
| 1,833,475 | Standish | Nov. 24, 1931 |
| 1,847,027 | Thomson et al. | Feb. 23, 1932 |
| 2,164,504 | Dodge | July 4, 1939 |
| 2,315,486 | Mulder | Apr. 6, 1943 |